(12) United States Patent
Soeng

(10) Patent No.: US 7,480,157 B1
(45) Date of Patent: Jan. 20, 2009

(54) POWER ARCHITECTURE FOR PROVIDING VOLTAGE MODULATION POWER

(75) Inventor: Edy Soeng, Taipei Hsien (TW)

(73) Assignee: Zippy Technology Corp., Taipei Hsien (TW)

(*) Notice: Subject to any disclaimer, the term of this patent is extended or adjusted under 35 U.S.C. 154(b) by 0 days.

(21) Appl. No.: 11/942,589

(22) Filed: Nov. 19, 2007

(51) Int. Cl.
*H02M 3/335* (2006.01)
*G05F 1/40* (2006.01)

(52) U.S. Cl. .................. 363/21.01; 363/97; 323/285

(58) Field of Classification Search .............. 363/16, 363/21.01, 97; 323/266, 284, 285, 290
See application file for complete search history.

(56) References Cited

U.S. PATENT DOCUMENTS 6,388,905 B2 * 5/2002 Nakagawa .................. 363/97
2002/0196006 A1 * 12/2002 Hwang ....................... 323/288
2007/0145956 A1 * 6/2007 Takeuchi .................... 323/207
2007/0195560 A1 * 8/2007 Yasumura ................ 363/21.01

* cited by examiner

*Primary Examiner*—Jessica Han
(74) *Attorney, Agent, or Firm*—Muncy, Geissler, Olds & Lowe, PLLC

(57) ABSTRACT

A power architecture for providing voltage modulation power is applied to a power supply including a PFC (Power Factor Correction) unit and a transformer, and the power supply further includes a power level correction unit, wherein the PFC unit decides a voltage modulation power level and converts the input power into a voltage modulation power, and the voltage modulation power is transformed into an output power through the transformer. A power level correction unit acquires a load utilization power signal from the output power and produces a power level correction signal to adjust the voltage modulation power level, which is decided by the PFC unit. Through adjusting the voltage modulation power level of the PFC unit, the PFC unit can produce voltage modulation power with different voltages according to the load variation, so as to reduce the internal loss of the power supply.

5 Claims, 5 Drawing Sheets

POWER ARCHITECTURE FOR PROVIDING VOLTAGE MODULATION POWER

FIELD OF THE INVENTION

The present invention is related to a power architecture for providing voltage modulation power, and more particularly, a voltage modulation circuit applied to power supply.

BACKGROUND OF THE INVENTION

The basic architecture of the general power supply includes a rectifier filter unit for obtaining input power, a PFC (Power Factor Correction) unit, a transformer, a switch unit for adjusting the coil current of the transformer, a PWM (Pulse Width Modulation) unit for producing a duty cycle for the switch unit, a back end rectifying output unit and a feedback unit, wherein after the input power is rectified and filtered by the rectifier filter unit, the PFC unit boosts thereof to a power level so as to form a voltage modulation power (generally, 380 V), and then, the transformer transforms to the back end rectifying output unit to output an output power for driving plural loads. The feedback unit acquires a feedback signal from the back end rectifying output unit to judge if the output power is stable and transmits the feedback signal back to the PWM unit for adjusting the switch unit to change the duty cycle of the transformer to transform the power, thereby adjusting the output voltage that is outputted to the back end rectifying output unit. Although the architecture of the above-described power supply is well known and used widely, the voltage modulation power level is fixed and not altered in accordance with different loads when the PFC unit receives the input power and boosts thereof into a voltage modulation power. Under this working model, the loss is less when the load is heavy, but when the load is light, the voltage modulation power generated by the PFC unit is still kept at the identical level, so that the loss ratio produced from voltage difference might become higher, and thus, the power utilization efficiency also becomes lower. Therefore, there is a need to solve this problem for conforming to the increasing requests for power utilization efficiency.

SUMMARY OF THE INVENTION

Consequently, the object of the present invention is to provide a circuit architecture for power supply which can reduce the loss during light load, so as to completely utilize the power.

The present invention is related to a power architecture for providing voltage modulation power applied to a power supply including a PFC (Power Factor Correction) unit and a transformer. The power supply further includes a power level correction unit, wherein the PFC unit decides a voltage modulation power level and converts the input power into a voltage modulation power, which achieves the voltage modulation power level, and the voltage modulation power is transformed into an output power through the transformer. A power level correction unit acquires a load utilization power signal from the output power so as to decide a ratio representing the load and the output power. After the power level correction unit obtains the load utilization power signal, a power level correction signal is produced to adjust the voltage modulation power level, which is decided by the PFC unit. Through the architecture described above, the PFC unit can adjust the voltage modulation power level, so that the PFC unit can produce voltage modulation power with different voltages no matter the load is light or heavy, so as to reduce the internal loss of the power supply.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
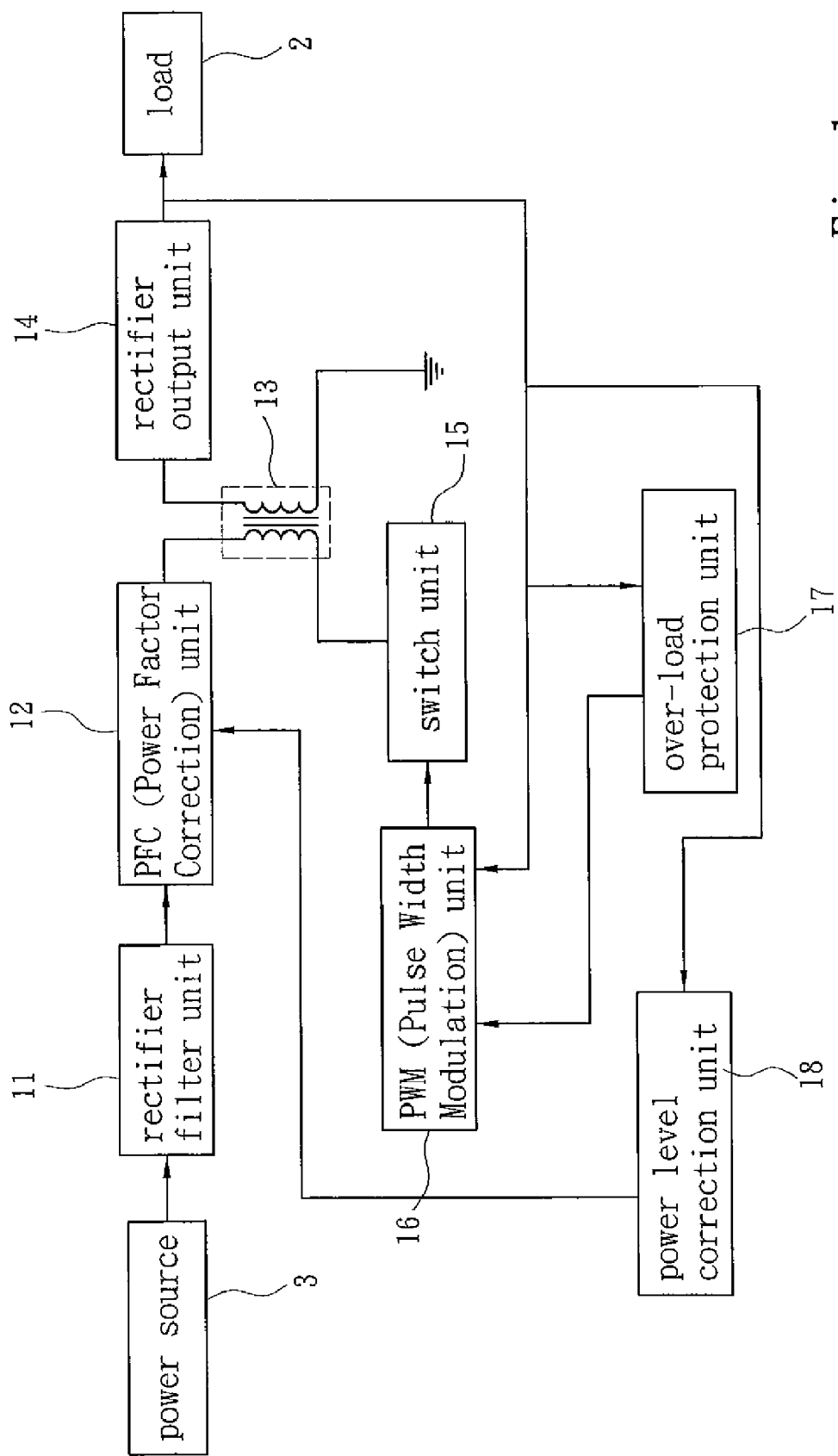
FIG. 1 is a circuit block diagram showing the architecture of the present invention.

The present invention is related to a power architecture for providing voltage modulation power, as shown in FIG. 1. The present invention can be utilized in a power supply which obtains an input power from a power source 3 and transforms the input power into an output power through a transformer 13 thereof. The power supply includes a rectifier filter unit 11, a PFC (Power Factor Correction) unit 12, a transformer 13 connected to the PFC unit 12, a rectifier output unit 14, a switch unit 15, a PWM (Pulse Width Modulation) unit 16 and an over-load protection unit 17 (which are all related to conventional architecture for the power supply and will not give more details), wherein the PFC unit 12 is connected to the power source 3 for obtaining the input power and has a voltage modulation power level for transforming the input power into a voltage modulation power so as to transmit thereof to a primary side of the transformer 13, the PWM unit 16 produces the duty cycle of the switch unit 15, so as to adjust the current passing through the coil at the primary side of the transformer 13, and the transformer 13 transforms the voltage modulation power into the output power for driving at least a load 2. Moreover, a power level correction unit 18 is further included for obtaining a load utilization power signal from the output power for providing to the PWM unit 16 to adjust the transformer 13 to switch to the secondary side, and for providing to the over-load protection unit 17 to judge if an over-load occurs, so as to produce an over-load protection signal to close the PWM unit 16. The power level correction unit 18 obtains the load utilization power signal to decide the load power utilization ratio, and then, outputs a power level correction signal to the PFC unit 12 for adjusting the voltage modulation power level and thus adjusting the voltage modulation power, thereby the voltage modulation power outputted by the PFC unit 12 to the transformer 13 can conform to the utilization ratio of the load 2. Therefore, when the load 2 varies, the voltage modulation power level of the PFC unit 12 can be adjusted. Also, the voltage modulation power at the primary side of the transformer 13 can be altered according to light load or heavy load, so that the internal loss can be reduced as the load 2 varies.

Figure 2:
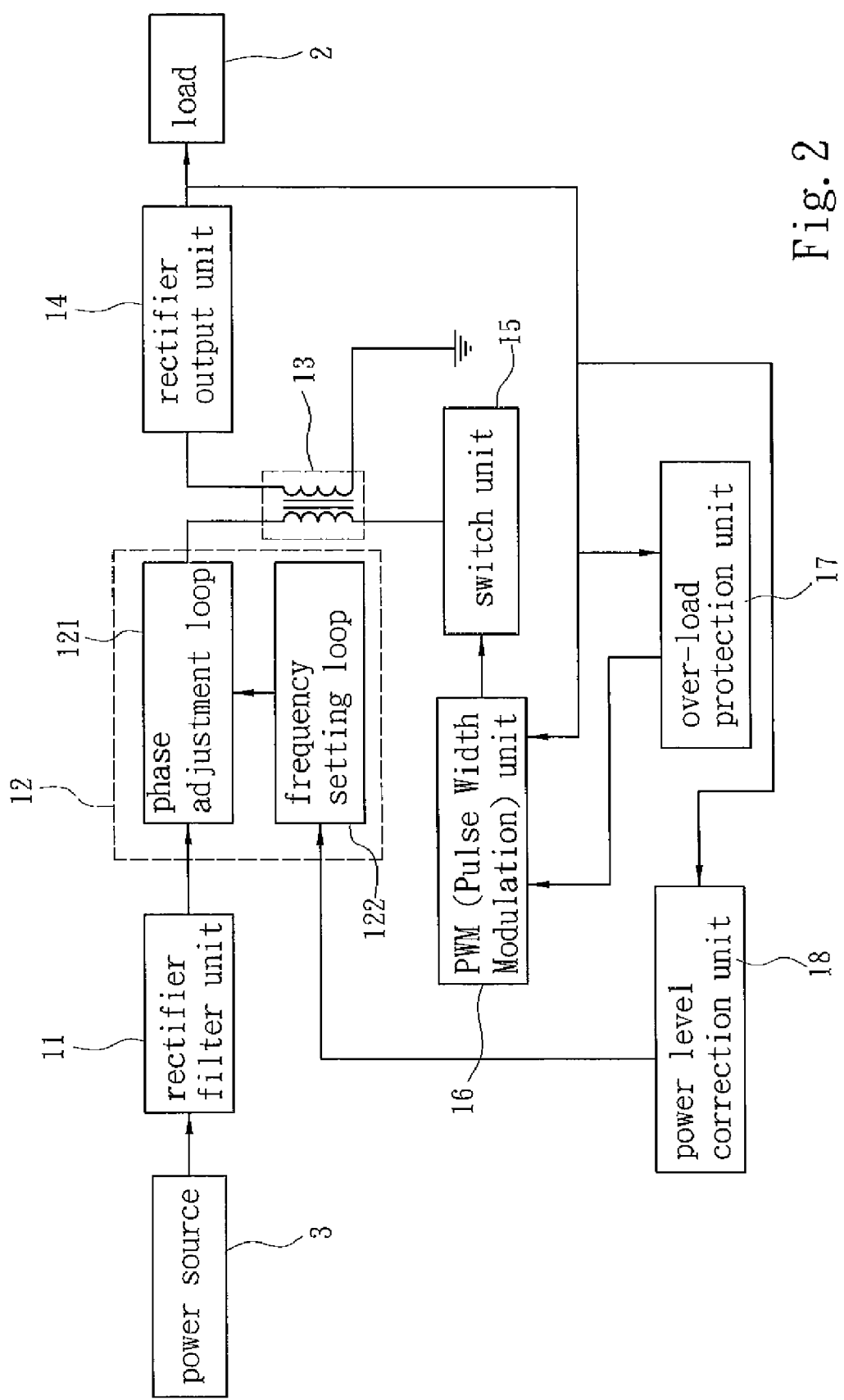
FIG. 2 is another circuit block diagram showing the architecture of the present invention.

The more detailed circuit architecture is shown in FIG. 2. The PFC unit 12 includes a phase adjustment loop 121 and a frequency setting loop 122, wherein the frequency setting loop 122 can produce a switch frequency and the phase adjustment loop 121 can convert and boost the input power, so as to form the voltage modulation power at the primary side of the transformer 13. The load utilization power signal acquired from the secondary side of the transformer 13 is obtained by the power level correction unit 18 for producing the power level correction signal to transmit to the frequency setting loop 122, so as to adjust the switch frequency, thereby changing the voltage modulation power produced by the phase adjustment loop 121.

Figure 3:
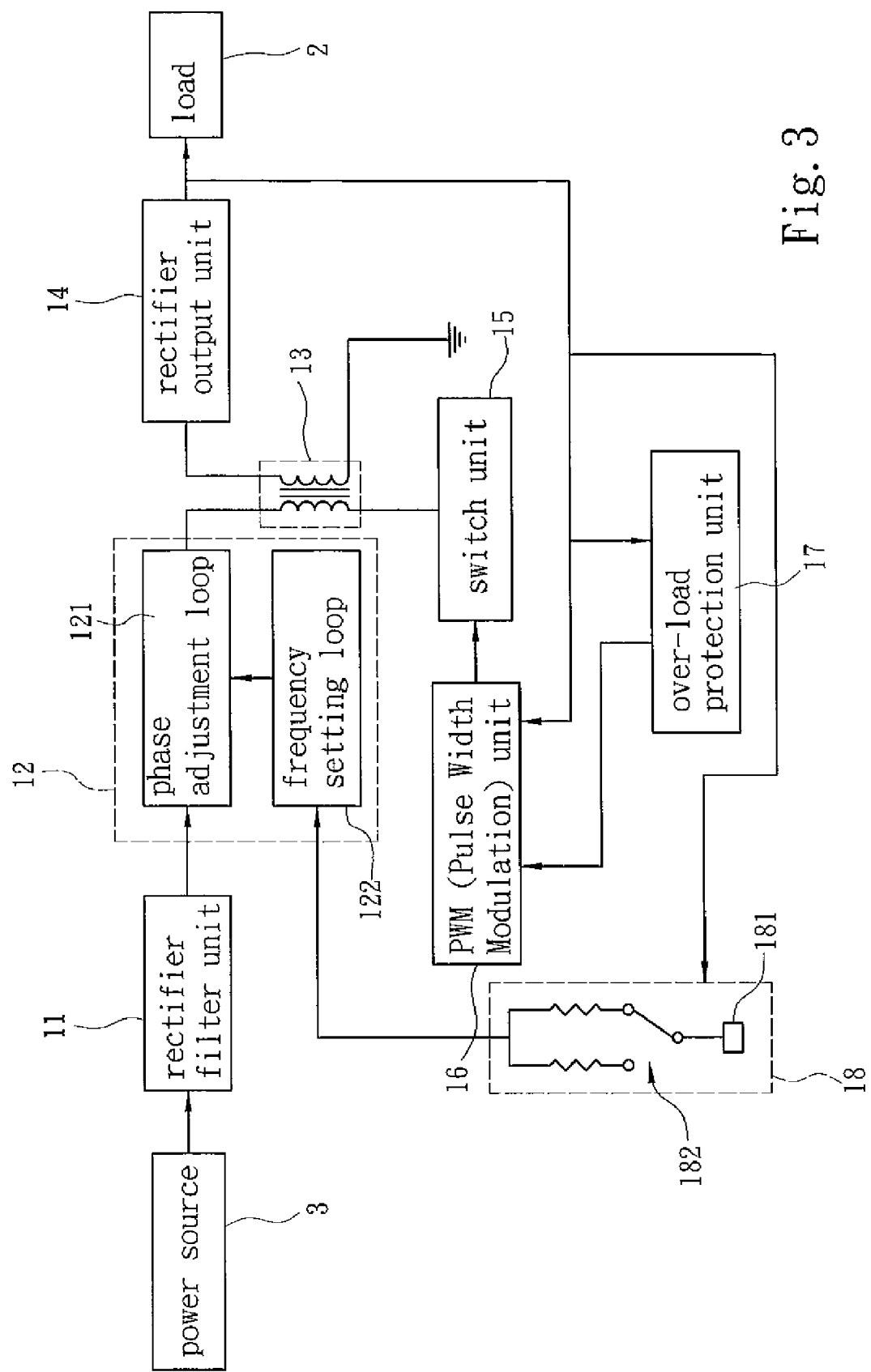
FIG. 3 is schematic view showing a first embodiment according to the present invention.
Figure 4:
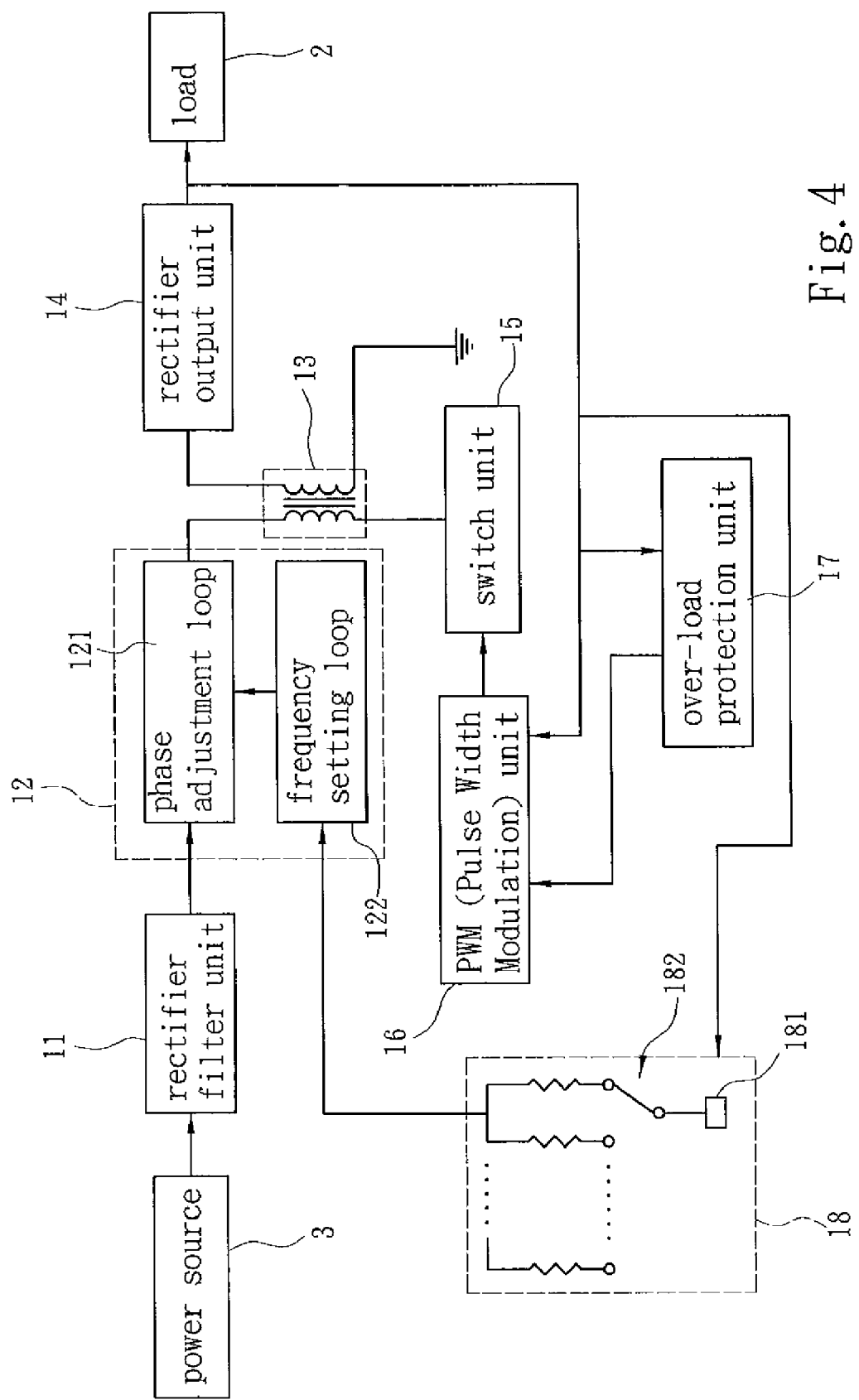
FIG. 4 is schematic view showing a second embodiment according to the present invention.

The frequency setting loop 122 can be set to have plural non-continuous switch frequencies, so that the phase adjustment loop 121 can form plural non-continuous working voltage levels for producing the voltage modulation power. Please refer to FIG. 3, the power level correction unit 18 can include two impedance loops with different impedances and a switching switch 182, which is connected to the impedance loops and is switched by the driving from the load utilization power signal, wherein one end of the switching switch 182 is connected to a voltage source 181 and the other end is connected to one of the impedances in the impedance loops. After the power produced by the voltage source 181 passes the impedance loop to form the power level correction signal, the signal is transmitted to the frequency setting loop 122 of the PFC unit 12. The switching switch 182 is driven by the load utilization power signal. When the load utilization power signal achieves a preset base power level, the switching switch 182 switches to connect to another impedance of the impedance loops, and thus, the power level correction signal can produce a non-linear variation, so as to change the switch frequency of the frequency setting loop 122 to have a non-continuous alternation. Please further refer to FIG. 4. The power level correction unit 18 also can include plural impedance loops with different impedances and a multi-sectional switching switch 182, which is switched among plural impedance loops by the driving from the load utilization power signal. Since the switching switch 182 is cooperated with the voltage source 181 and switched among plural impedance loops with different impedances so as to form non-continuous power level correction signal, the frequency setting loop 122 can produce plural non-continuous switch frequencies for adjusting the voltage modulation power at the primary side of the transformer 13.

Figure 5:
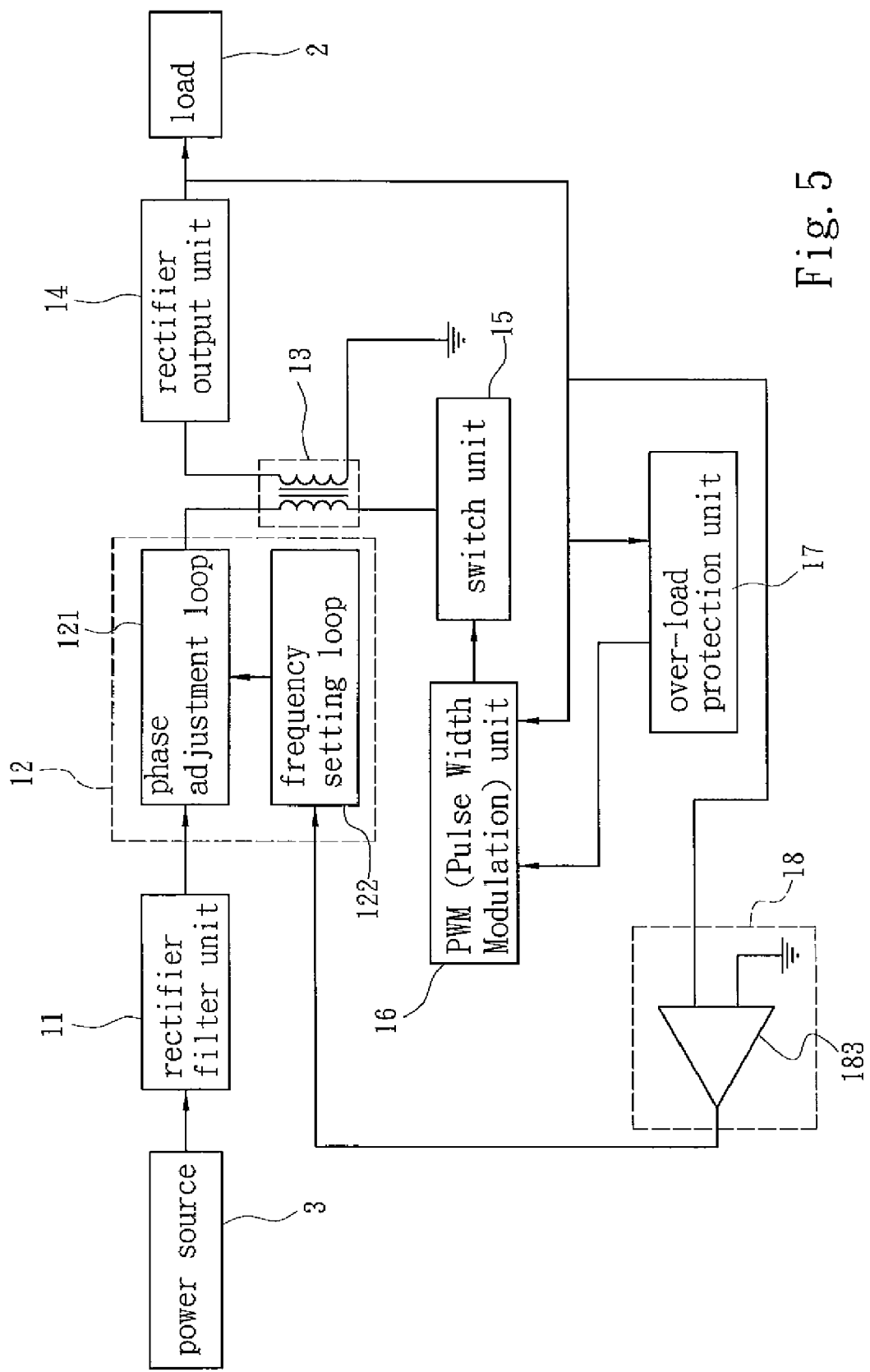
FIG. 5 is schematic view showing a third embodiment according to the present invention.

Please refer another embodiment shown in FIG. 5. The power level correction unit 18 can be an amplifier loop 183. After the amplifier loop 183 obtains the load utilization power signal, a power level correction signal, which is formed through a particular proportion between the gain of the amplifier loop 183 and the load utilization power signal, is sent to the frequency setting loop 122, and since the power level correction signal produced by the amplifier loop 183 is a linear signal, the frequency setting loop 122 can produce a continuous frequency switching variation for adjusting the working voltage at the primary side of the transformer 13, thereby achieving a linear working voltage variation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power architecture for providing voltage modulation power, connected to a power source for obtaining an input power and converting thereof into an output power so as to drive at least a load of a power supply, wherein the power supply comprises:
    a PFC (Power Factor Correction) unit, connected to the power source and having a voltage modulation power level for converting the input power into a voltage modulation power;
    a transformer, whose primary side is connected to the PFC unit and which is used to receive the voltage modulation power for transforming thereof into the output power; and
    a power level correction unit, connected to a secondary side of the transformer for receiving the output power, which drives the load, so as to acquire a load utilization power signal, wherein the power level correction unit decides a load power utilization ratio according to the load utilization power signal and outputs a power level correction signal to the PFC unit for adjusting the voltage modulation power level so as to adjust the voltage modulation power, so that the PFC unit outputs a voltage-modulate power which conforms to the utilization power ratio of the load to the transformer.

2. The power architecture as claimed in claim 1, wherein the PFC unit has a frequency setting loop for producing a switch frequency and a phase adjusting loop for, according to the switch frequency, converting the input power into the voltage modulation power, and the power level correction unit outputs the power level correction signal to the frequency setting loop for adjusting the switch frequency.

3. The power architecture as claimed in claim 2, wherein the frequency setting loop sets plural non-continuous switch frequencies for adjustment.

4. The power architecture as claimed in claim 3, wherein the power level correction unit includes plural impedance loops with different impedances and a multi-sectional switching switch, wherein one end of the multi-sectional switching switch is connected to a voltage source and the other end is connected to plural impedance loops through switching, and the multi-sectional switching switch is driven by the load utilization power signal to switch among plural impedance loops.

5. The power architecture as claimed in claim 2, wherein the power level correction unit has an amplifier loop for acquiring the load utilization power signal, so as to produce a power level correction signal which has a particular proportion to the load utilization power signal.

* * * * *